(12) United States Patent
Niv

(10) Patent No.: US 6,833,955 B2
(45) Date of Patent: Dec. 21, 2004

(54) COMPACT TWO-PLANE OPTICAL DEVICE

(75) Inventor: Yehuda Niv, Nes Ziona (IL)

(73) Assignee: Planop Planar Optics Ltd., Rehovot (IL)

( * ) Notice: Subject to any disclaimer, the term of this patent is extended or adjusted under 35 U.S.C. 154(b) by 44 days.

(21) Appl. No.: 09/971,906

(22) Filed: Oct. 9, 2001

(65) Prior Publication Data

US 2003/0067685 A1 Apr. 10, 2003

(51) Int. Cl.$^7$ .............................................. G02B 27/44
(52) U.S. Cl. .......................... 359/566; 359/572; 359/15; 359/34
(58) Field of Search .................... 359/566, 300, 359/15, 558, 569, 571, 572, 573, 13, 34, 19, 630, 633; 345/7, 8, 9

(56) References Cited

U.S. PATENT DOCUMENTS

| | | | |
|---|---|---|---|
| 4,711,512 A | | 12/1987 | Upatnieks |
| 5,224,198 A | | 6/1993 | Jachimowicz et al. |
| 5,742,262 A | * | 4/1998 | Tabata et al. ............ 345/8 |
| 5,835,661 A | * | 11/1998 | Tai et al. ............ 385/146 |
| 5,966,223 A | | 10/1999 | Friesem et al. |

FOREIGN PATENT DOCUMENTS

| JP | 04097201 A | * | 3/1992 | ......... G02B/5/18 |
|---|---|---|---|---|
| WO | WO 95/11473 | | 4/1995 | |
| WO | WO 99/52002 | | 10/1999 | |

* cited by examiner

Primary Examiner—Thong Nguyen
Assistant Examiner—Arnel C. Lavarias
(74) Attorney, Agent, or Firm—G. E. Ehrlich (1995) Ltd.

(57) ABSTRACT

An optical device for enlarging an eye box, the optical device comprising: (a) a first optical expander being carried by, or formed in, a first light-transmissive substrate engaging a first plane; and (b) a second optical expander being carried by, or formed in, a second light-transmissive substrate engaging a second plane being spaced apart from the first plane. The first and the second optical expanders designed and configured such that light passing through the first optical expander is expanded in a first dimension, enters the second light-transmissive substrate through the second optical expander, and exits from the second light-transmissive substrate, expanded in a second dimension, hence enlarging an eye box of the optical device in both the first and the second dimensions.

141 Claims, 3 Drawing Sheets

COMPACT TWO-PLANE OPTICAL DEVICE

FIELD AND BACKGROUND OF THE INVENTION

The present invention relates to a compact optical device and, more particularly, to a compact optical device which can be used in personal hand-held devices, such as personal digital assistant (PDA), portable telephones and the like.

Miniaturization of electronic devices has always been a continuing objective in the field of electronics. Electronic devices are often equipped with some form of display, which is visible to a user. As these devices reduce in size, there is an increase need for manufacturing compact displays, which are compatible with small size electronic devices. Besides having small dimensions, such displays should not sacrifice image quality, and be available at low cost. By definition the above characteristics are conflicting and many attempts have been made to provide some balanced solution.

An electronic display may provide a real image, the size of which is determined by the physical size of the display device, or a virtual image, the size of which may extend the dimensions of the display device.

A real image is defined as an image, projected on a viewing surface positioned at the location of the image, and observed by an unaided human eye. Examples of real image displays include a cathode ray tube (CRT) or a liquid crystal display (LCD). Typically, desktop computer systems and workplace computing equipment utilize CRT display screens to display images for a user. The CRT displays are heavy, bulky, and not easily miniaturized. For a laptop, a notebook, or a palm computer, flat-panel display is typically used. The flat-panel display may use LCD technology implemented as passive matrix or active matrix panel. The passive matrix LCD panel consists of a grid of horizontal and vertical wires. Each intersection of the grid constitutes a single pixel, and is controlled by a LCD element. The LCD element either allows light through or blocks the light. The active matrix panel uses a transistor to control each pixel, and is more expensive.

The flat-panels are also used for miniature image display systems because of their compactness and energy efficiency compared to the CRT displays. Various configurations of miniature display systems using flat-panel display and reflective lighting technique can be found in U.S. Pat. No. 5,808,800.

Small size real image displays have a relatively small surface area on which to present a real image, thus have limited capability for providing sufficient information to the user. In other words, because of the limited resolution of the human eye, the amount of details resolved from a small size real image may be insufficient.

By contrast to a real image, a virtual image is defined as an image, which cannot be projected onto a viewing surface, since no light ray connects the image and an observer. A virtual image can only be seen through an optic element, for example a typical virtual image can be obtained from an object placed in front of a converging lens, between the lens and its focal point. Light rays, which are reflected from an individual point on the object, diverge when passing through the lens, thus no two rays share two endpoints. An observer, viewing from the other side of the lens would perceive an image, which is located behind the object, hence enlarged. A virtual image of an object, positioned at the focal plane of a lens, is said to be projected to infinity.

Conventional virtual image displays are known to have many shortcomings. For example, such displays have suffered from being too heavy for comfortable use, as well as too large so as to be obtrusive, distracting, and even disorienting. These defects stem from, among other things, the incorporation of relatively large optics systems within the mounting structures, as well as physical designs which fail to adequately take into account important factors as size, shape, weight, etc.

Recently, holographic optical elements have been used in portable virtual image displays. Holographic optical elements serve as an imaging lens and a combiner where a two-dimensional, quasi-monochromatic display is imaged to infinity and reflected into the eye of an observer. A common problem to all types of holographic optical elements is their relatively high chromatic dispersion. This is a major drawback in applications where the light source is not purely monochromatic. Another drawback of some of these displays is the lack of coherence between the geometry of the image and the geometry of the holographic optical element, which causes aberrations in the image array that decrease the image quality.

New designs, which typically deal with a single holographic optical element, compensate for the geometric and chromatic aberrations by using non-spherical waves rather than simple spherical waves for recording; however, they do not overcome the chromatic dispersion problem. Moreover, with these designs, the overall optical systems are usually very complicated and difficult to manufacture. Furthermore, the eye-motion-box of the optical viewing angles resulting from these designs is usually very small, typically less than 10 mm. Hence, the performance of the optical system is very sensitive, even to small movements of the visor relative to the eye of the viewer.

In some conventional holographic displays a readout light source must be located at some distance from the hologram, in order to illuminate its entire surface. Such configurations lead to holographic display systems which are bulky, space-consuming and sometimes inconvenient to use. International Patent Application No. WO 99/52002, the contents of which are hereby incorporated by reference, discloses compact holographic optical device in which both the aberrations and chromatic dispersions are minimized, and the readout light source must not be located at some distance from the hologram. The disclosed holographic optical device may also act as a beam expander for magnifying a narrow, collimated beam into a beam of larger diameter. Although the overall volume of this compact holographic optical device is substantially reduced compared to other known display devices, the compactness is still insufficient for displays of ultra compact electronic systems such as portable telephones and personal digital assistant.

There is thus a widely recognized need for, and it would be highly advantageous to have, a compact optical device devoid of the above limitation.

SUMMARY OF THE INVENTION

According to one aspect of the present invention there is provided an optical device for enlarging an eye box, the optical device comprising: (a) a first optical expander being carried by, or formed in, a first light-transmissive substrate engaging a first plane; and (b) a second optical expander being carried by, or formed in, a second light-transmissive substrate engaging a second plane being spaced apart from the first plane; the first and the second optical expanders being designed and configured such that light passing through the first optical expander is expanded in a first dimension, enters the second light-transmissive substrate, through the second optical expander and exits from the second light-transmissive substrate expanded in a second dimension, hence enlarging an eye box of the optical device in both the first and the second dimensions.

According to another aspect of the present invention there is provided a method of enlarging an eye box, the method comprising: (a) expanding inputted light rays in a first dimension by passing the light rays through a first optical expander engaging a first plane; and (b) expanding the inputted light rays in a second dimension by passing the light rays through a second optical expander engaging a second plane being spaced apart from the first plane; hence enlarging the eye box in both the first and the second dimensions.

According to further features in preferred embodiments of the invention described below, the method further comprising prior to step (b): passing the light rays through an optical trapping element engaging the second plane and being laterally displaced from the second optical expander thereby propagating the light rays through a light guide in a direction of the second optical expander.

According to still further features in the described preferred embodiments the method further comprising collimating the inputted light.

According to still further features in the described preferred embodiments the collimating is done by a converging lens.

According to still further features in the described preferred embodiments the collimating is done by a diffractive optical element.

According to still further features in the described preferred embodiments the method further comprising redirecting the inputted light, so as to reduce a distance between the first plane and an input light source producing the inputted light.

According to still further features in the described preferred embodiments the redirecting is done by a 45 degrees mirror.

According to yet another aspect of the present invention there is provided a method of manufacturing an optical device for enlarging an eye box, the method comprising: (a) positioning a first light-transmissive substrate having a first optical expander carried thereby, or formed therein in a first plane; and (b) positioning a second light-transmissive substrate having a second optical expander carried thereby, or formed therein, the first and the second optical expanders designed and configured such that light passing through the first optical expander is expanded in a first dimension, enters the second light-transmissive substrate, through the second optical expander and exits from the second light-transmissive substrate expanded in a second dimension.

According to still another aspect of the present invention there is provided an optical device for enlarging an eye box, the optical device comprising: a first light-transmissive substrate engaging a first plane; and a second light-transmissive substrate engaging a second plane being spaced apart from the first plane; the first and second light-transmissive substrates designed and configured such that light passing through the device is first expanded in a first dimension within the first light-transmissive substrate, and then expanded in a second dimension within the second light-transmissive substrate, hence enlarging an eye box of the optical device in both the first and the second dimensions.

According to further features in preferred embodiments of the invention described below, the optical device further comprising an input light source for producing the light.

According to still further features in the described preferred embodiments the optical device further comprising: (c) an optical trapping element being carried by, or formed in, the second light-transmissive substrate and being laterally displaced from the second optical expander;

According to still further features in the described preferred embodiments the optical device further comprising a collimator for collimating the light produced by the input light source.

According to still further features in the described preferred embodiments the optical device further comprising at least one optical element for redirecting light rays, positioned so as to reduce an overall size of the optical device.

According to still further features in the described preferred embodiments the first and second planes are substantially parallel.

According to still further features in the described preferred embodiments the first and second dimensions are substantially orthogonal.

According to still further features in the described preferred embodiments the input light source comprises an input display source, hence the light constitutes an image.

According to still further features in the described preferred embodiments the first and second optical expanders substantially parallel one another and at least partially overlap in a direction substantially perpendicular both thereto.

According to still further features in the described preferred embodiments the first optical expander is configured and designed so as to transform spherical waves emanating from the input display source into plane waves, to at least partially diffract the plane waves, and to reflect the plane waves within the first light-transmissive substrate, hence to expand the image in the first dimension.

According to still further features in the described preferred embodiments the second optical expander is configured and designed so as to at least partially diffract at least a portion of light rays exiting the first light-transmissive substrate, hence to expand the image in the second dimension, and to couple the light rays out of the second light-transmissive substrate in a direction of an eye of a user.

According to still further features in the described preferred embodiments the optical trapping element is configured and designed so as to trap at least a portion of light rays exiting the first light-transmissive substrate, inside the second light-transmissive substrate by substantially total internal reflection, hence to propagate the plurality of light rays in a direction of the second optical expander.

According to still further features in the described preferred embodiments the second optical expander is configured and designed so as to at least partially diffract the plurality of light rays, propagated through the second light-transmissive substrate, hence to expand the image in the second dimension, and to couple the plurality of light rays out of the second light-transmissive substrate in a direction of an eye of a user.

According to still further features in the described preferred embodiments each of the first and the second optical expanders is embodied in the light-transmissive substrates by recording an interference pattern of two mutually coherent optical waves.

According to still further features in the described preferred embodiments the interference pattern comprise linear diffraction gratings.

According to still further features in the described preferred embodiments the linear diffraction gratings of the second optical expander is substantially orthogonal to the linear diffraction gratings of the first optical expander.

According to still further features in the described preferred embodiments the linear diffraction gratings of the first and second optical expanders are each independently selected from the group consisting of reflection linear diffraction gratings and transmission linear diffraction gratings.

According to still further features in the described preferred embodiments the recording is effected by a procedure selected from a group consisting of computer-generated masks, lithography, embossing, etching and direct writing.

According to still further features in the described preferred embodiments the optical trapping element is embodied in the light-transmissive substrates by recording an interference pattern of two mutually coherent optical waves.

According to still further features in the described preferred embodiments the linear diffraction gratings of the optical trapping element is substantially orthogonal to the linear diffraction gratings of the first optical expander.

According to still further features in the described preferred embodiments the linear diffraction gratings of the optical trapping element is substantially parallel to the linear diffraction gratings of the second optical expander.

According to still further features in the described preferred embodiments the linear diffraction gratings of the second optical expander and the optical trapping element are with equal periodicity.

According to still further features in the described preferred embodiments each of the first and second light-transmissive substrates comprises a first surface and a second surface.

According to still further features in the described preferred embodiments the first optical expander is embodied in the first surface of the first light-transmissive substrate.

According to still further features in the described preferred embodiments the first optical expander is embodied in the second surface of the first light-transmissive substrate.

According to still further features in the described preferred embodiments the collimator comprises a converging lens.

According to still further features in the described preferred embodiments the collimator comprises a diffractive optical element carried by or formed in, the first light-transmissive substrate.

According to still further features in the described preferred embodiments the at least one optical element is a 45 degrees mirror.

According to still further features in the described preferred embodiments each of the first optical expander and the second optical expander has a predetermined diffraction efficiency.

According to still further features in the described preferred embodiments the optical trapping element has a predetermined diffraction efficiency.

According to still further features in the described preferred embodiments the predetermined diffraction efficiency varies locally for achieving an output having substantially uniform light intensities.

According to still further features in the described preferred embodiments the predetermined diffraction efficiency varies locally for achieving an output having predefined intensities.

According to still further features in the described preferred embodiments the first and the second optical expanders are each independently a plurality of linearly stretched mini-prisms, carried by a variable light transmissive surface.

According to still further features in the described preferred embodiments the optical trapping element is a plurality of linearly stretched mini-prisms.

According to still further features in the described preferred embodiments the first light-transmissive substrate and the second light-transmissive substrate are of thickness ranging between about 0.5 mm and about 5 mm.

According to still further features in the described preferred embodiments the first light-transmissive substrate and the second light-transmissive substrate are each independently selected from the group consisting of glass and transparent plastic.

The present invention successfully addresses the shortcomings of the presently known configurations by providing an optical device for enlarging an eye box.

Implementation of the method and device of the present invention involves performing or completing selected tasks or steps manually, automatically, or a combination thereof. Moreover, according to actual instrumentation and equipment of preferred embodiments of the method and device of the present invention, several selected steps could be implemented by hardware or by software on any operating device of any firmware or a combination thereof. For example, as hardware, selected steps of the invention could be implemented as a chip or a circuit. As software, selected steps of the invention could be implemented as a plurality of software instructions being executed by a computer using any suitable operating device. In any case, selected steps of the method and device of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of an optical device which can be used to enlarge an eye-box. Specifically, the present invention can be used to enlarge an eye-box of a display embodied in e.g., cellular telephones.

Figures 1, 2A:
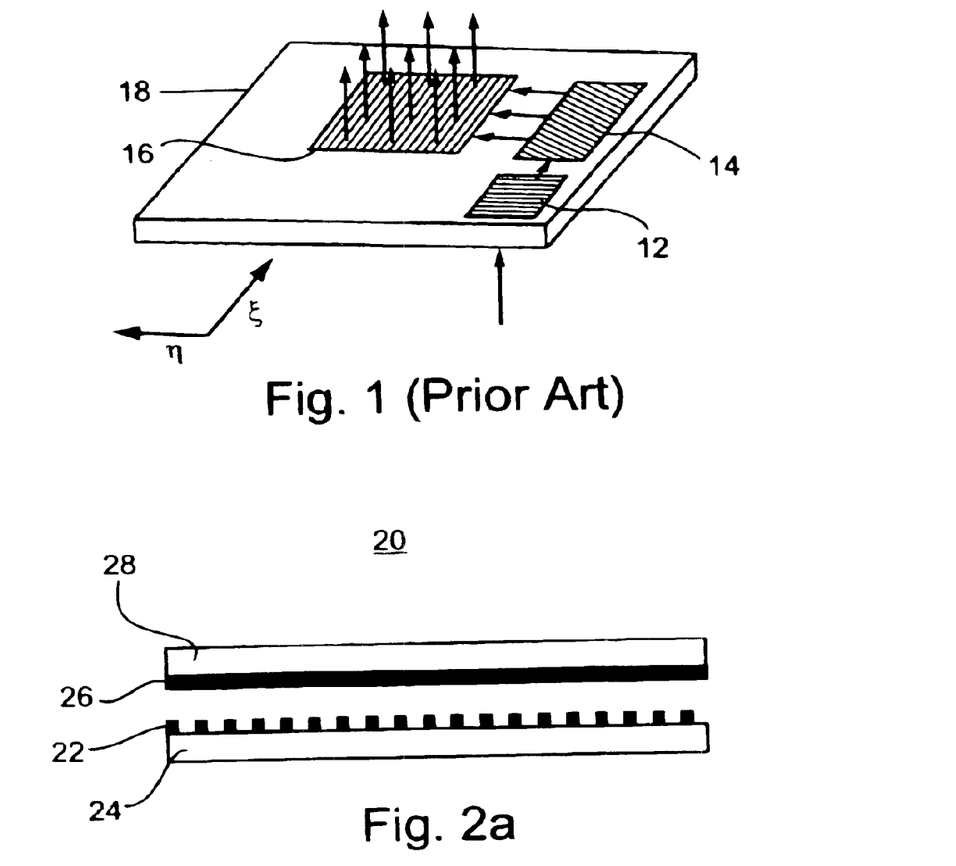
FIG. 1 is a three-dimensional view of a prior art planar optical configuration.
FIG. 2a is a short side view of a device for enlarging an eye-box according to the teachings of the present invention.

For purposes of better understanding the present invention, as illustrated in FIGS. 2–6 of the drawings, reference is first made to the construction and operation of a prior art display as illustrated in FIG. 1.

Hence, FIG. 1 illustrates a three-dimensional view of a planar optical configuration disclosed in International Patent Application No. WO 99/52002, which is referred to herein as device 10. Device 10 includes a first holographic optical element 12, a second holographic optical element 14 and a third holographic optical element 16, formed in a light-transmissive substrate 18. Second holographic optical element 14 is laterally displaced from first holographic optical element 12. The displacement direction of second holographic optical element 14 from first holographic optical element 12 is referred to herein as direction $\xi$, and the orthogonal direction to $\xi$ is referred to herein as direction $\eta$. The transverse dimensions, i.e., the dimensions along $\eta$ axis, of both second holographic optical element 14 and first holographic optical element 12 are substantially equal, whereas the longitudinal dimension (along $\xi$ axis), of second holographic optical element 14 is larger than the longitudinal dimension of first holographic optical element 12. Third holographic optical element 16 is further laterally displaced from second holographic optical element 14 in $\eta$ direction. Both transverse and longitudinal dimensions of third holographic optical element 16 are substantially equal to the longitudinal dimension of second holographic optical element 14.

First holographic optical element 12 is illuminated by light, which may be generated by a light source located behind first holographic optical element 12. The illuminating light is diffracted by first holographic optical element 12 in a manner such that the light is trapped inside light-transmissive substrate 18 and propagates in direction therethrough by substantially total internal reflection, as disclosed in International Patent Application No. WO 99/52002. The physical phenomenon of total internal reflection is herein described.

Considering a ray of light moving within a light-transmissive substrate and striking one of its internal surfaces at an angle $\theta_1$ as measured from a normal to the surface. Whether the light ray is reflected from the surface or refracted out of the surface into open air being in contact with the substrate, is determined by Snell's law, which is mathematically realized through the following formula:

$$n_1 \sin \theta_1 = n_2 \sin \theta_2, \quad \text{(Eq. 1)}$$

where $n_1$ is the index of refraction of the light-transmissive substrate, $n_2$ is the index of refraction of the air ($n_1 > n_2$), and $\theta_2$ is the angle in which the ray is refracted out, in case of refraction. Similarly to $\theta_1$, $\theta_2$ is measured from a normal to the surface. Given the impact angle, $\theta_1$, and the refraction indices, $n_1$ and $n_2$, Equation 1 has a solution for $\theta_2$ only for $\theta_1$ which is smaller than arcsine of $n_2/n_1$ often called the critical angle. Hence, for sufficiently large $\theta_1$ (above the critical angle), no refraction angle $\theta_2$ satisfies Equation 1 and light energy is trapped within light-transmissive substrate. In other words, the light is reflected from the internal surface as if it had stroked a mirror. Under these conditions, total internal reflection is said to take place.

The propagated light, after a few reflections within light-transmissive substrate 18, reaches second holographic optical element 14, which diffracts the light so that the light propagates, still within light-transmissive substrate 18, however in $\eta$ direction. Third holographic optical element 16 couples the trapped light outward from light-transmissive substrate 18, in a direction calculated to reach an eye of a user.

The trapped light is propagated in a form of plane wave. The difference between the longitudinal dimensions of first holographic optical element 12 and second holographic optical element 14 increases the $\xi$ axis diameter of the plane waves by a factor which is equal to the ratio between the two longitudinal dimensions. Similarly, the difference between the transverse dimensions of second holographic optical element 14 and third holographic optical element 16 increases the $\eta$ axis diameter of the plane waves by a factor which is equal to the ratio between the two transverse dimensions. Hence, first, second and third holographic optical elements expand an image constituted by the input light in two dimensions, thereby enlarging the eye-box of the display.

The factor of eye-box enlargement depends on the ratios between the physical dimensions of the optical elements embodied in device 10. As explained hereinabove, first 12, second 14 and third 16 holographic optical elements are configured in a planar geometry, namely engaging a single plane. The minimal area of the plane is larger than the sum of areas of the three holographic optical elements.

In the field of miniature image display systems there are continuing challenges to design smaller systems, which should be compact enough to be embodied within other devices such as a portable phone or a personal digital assistant. It should be appreciated that the compactness of device 10 is limited on account of the above described planar construction, hence device 10 has limited capability for being compatible with small size electronic systems.

While reducing the present invention to practice, it was uncovered that the geometrical limitation of device 10 may be overcome by providing an optical device for enlarging an eye box, referred to herein as device 20.

The principles and operation of an optical device for enlarging an eye box according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2B:
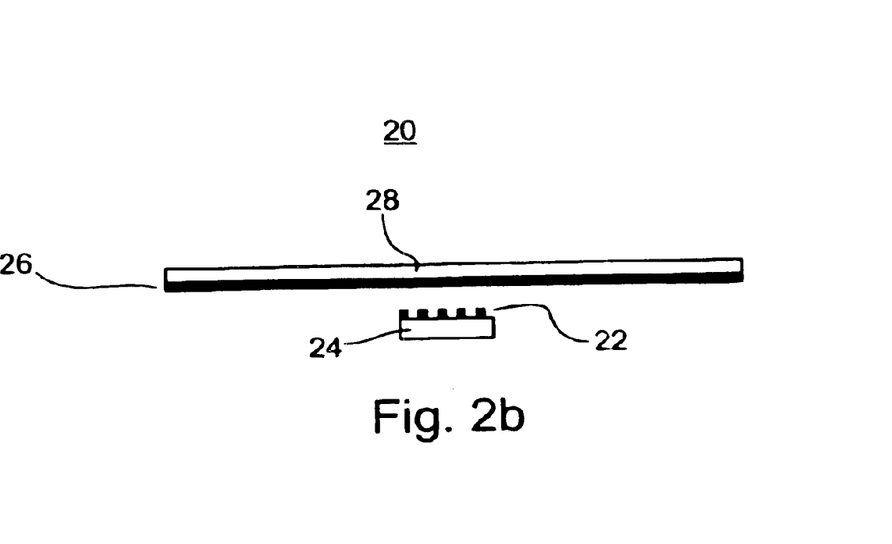
FIG. 2b is a long side view of a device for enlarging an eye-box according to the teachings of the present invention.

Referring again to the drawings, FIGS. 2a and 2b illustrate, respectively, a first (short) and a second (long) side view of device 20 of the present invention. Device 20 includes a first optical expander 22 which is carried by, or formed in, a first light-transmissive substrate 24. First optical expander 22 and first light-transmissive substrate 24 serve for expanding input light passing therethrough in a first dimension, as further detailed hereinunder. As seen, first light-transmissive substrate 24 engages a first plane.

Device 20 further includes a second optical expander 26 which is carried by, or formed in a second light-transmissive substrate 28. Second optical expander 26 and second light-transmissive substrate 28 serve for expanding the light passing therethrough, in a second dimension, as further detailed hereinunder. According to a preferred embodiment of the present invention, second light-transmissive substrate 28 is engaging a second plane, which second plane is spaced apart, preferably about 0.5 mm–2 mm, from the first plane. In the presently preferred embodiment of the invention, the first plane and the second plane are substantially parallel. In other embodiments of the invention the planes may have any other, i.e., non-parallel, mutual position in space.

Thus, the two-plane configuration of device 20 ensures that each light-transmissive substrate expands the light in one dimension, whereas the output of first light-transmissive substrate 24 becomes the input of second light-transmissive substrate 28. Hence device 20 enlarges an eye box in two dimensions.

Figure 3:
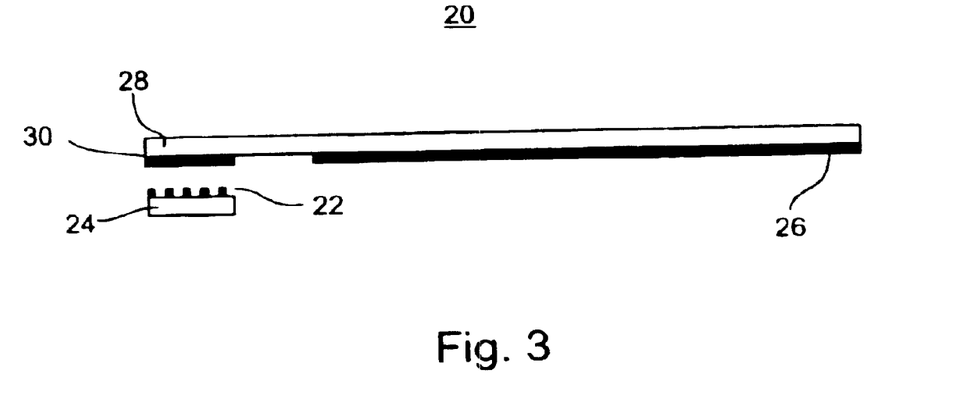
FIG. 3 is a long side view of a device for enlarging an eye-box further including an optical trapping element according to the teachings of the present invention.

Reference is now made to FIG. 3, which depicts a second (long) side view of device 20, demonstrating another preferred embodiment of the invention. Hence, device 20 may further include an optical trapping element 30 which is carried by, or formed in, second light-transmissive substrate 28, and is laterally displaced from second optical expander 26. Optical trapping element 30 serves for re-directing the light expanded by first optical expander 22 and first light-transmissive substrate 24, so as to propagate the light within second light-transmissive substrate 28 in a direction of second optical expander 26, by substantially total internal reflection. In an example, optical element 30 is a diffractive optical element. The process of using a diffractive optical element to enable light propagation within a light-transmissive substrate, is known in the art and is described in, for example, U.S. Pat. No. 4,711,512, the contents of which are hereby incorporated by reference.

It should be understood that the description further detailed hereinunder holds in the preferred embodiments in which optical trapping element 30 is either included or excluded.

Figure 4:
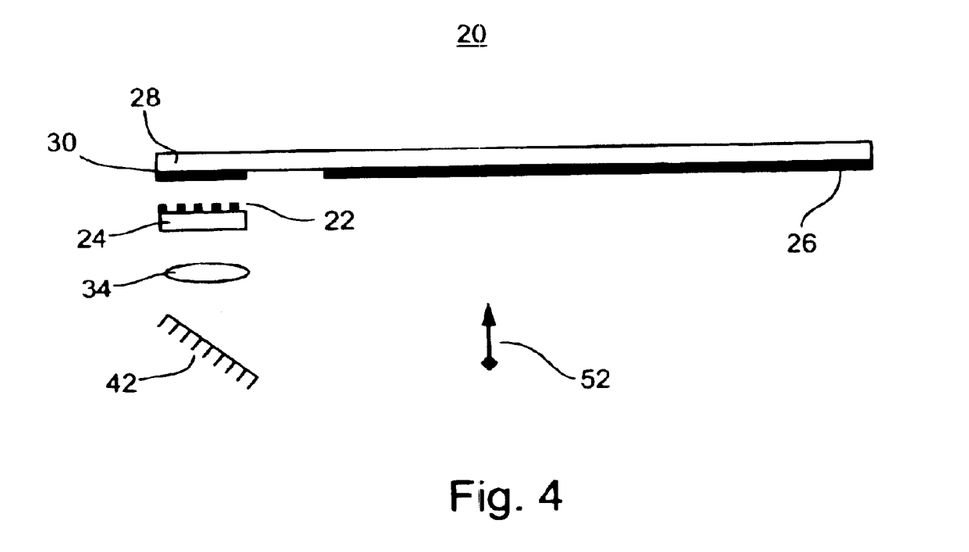
FIG. 4 is a long side view of a device for enlarging an eye-box further including a collimator, at least one optical element for redirecting light rays and an input light source, according to the teachings of the present invention.

Reference is now made to FIG. 4, showing the long side view of device 20. Hence, device 20 may further include a collimator 34, at least one optical element 42 for redirecting light rays and/or an input light source 52.

Collimator 34 is positioned behind first light-transmissive substrate 24. Collimator 34 serves for collimating the input light, if it is not already collimated, prior to impinging on first light-transmissive substrate 24. Any collimating element known in the art may be used as collimator 34, for example a converging lens or a diffractive optical element. The purpose of the collimating procedure is for improving the imaging ability.

In case of a converging lens, a light ray going through a typical converging lens that is normal to the lens and passes through its center, defines the optical axis. The bundle of rays passing through the lens cluster about this axis and may be well imaged by the lens. Other collimating means e.g., a diffractive optical element, may also provide imaging functionality, although for such means the optical axis is not well defined. The advantage of a converging lens is due to its symmetry about the optical axis, whereas the advantage of a diffractive optical element is due to its compactness. The diffractive optical element may be spaced apart, carried by or formed in first light-transmissive substrate 24. A skilled artisan will appreciate that in the preferred embodiment in which collimator 34 is a diffractive optical element, it may be positioned either on the entry surface of first light-transmissive substrate 24, as a transmissive diffractive element or on the opposite surface of first light-transmissive substrate 24 as a reflective diffractive element.

According to a preferred embodiment of the present invention, optical element(s) 42, are positioned so as to reduce an overall size of device 20. Some optical devices function better when light sources are placed within a certain distance therefrom. By including optical element 42, the pathway of the light rays is "folded", hence optical element 42 allows control over the cross-sectional size of device 20. According to a preferred embodiment of the present invention optical element 42 may be as simple as a 45 degrees mirror or any other optical element known in the art for redirecting light.

As shown in FIG. 4, input light source 52 is positioned behind first light-transmissive substrate 24. Input light source 52 may reflect or transmit light, impinging first light-transmissive substrate 24, thereby the light constitutes an image of input light source 52. Input light source 52 may be in any form known in the art, such as but not limited to, a flat panel display e.g., LCD, a virtual image produced by other optical device, a fiber bundle guiding image information or an array of organic/inorganic light emitting diodes. In the preferred embodiments in which the reflected/transmitted light is not already collimated, collimator 34 is positioned between input light source 52 and first light-transmissive substrate 24, for collimating the light as described above.

Figure 5:
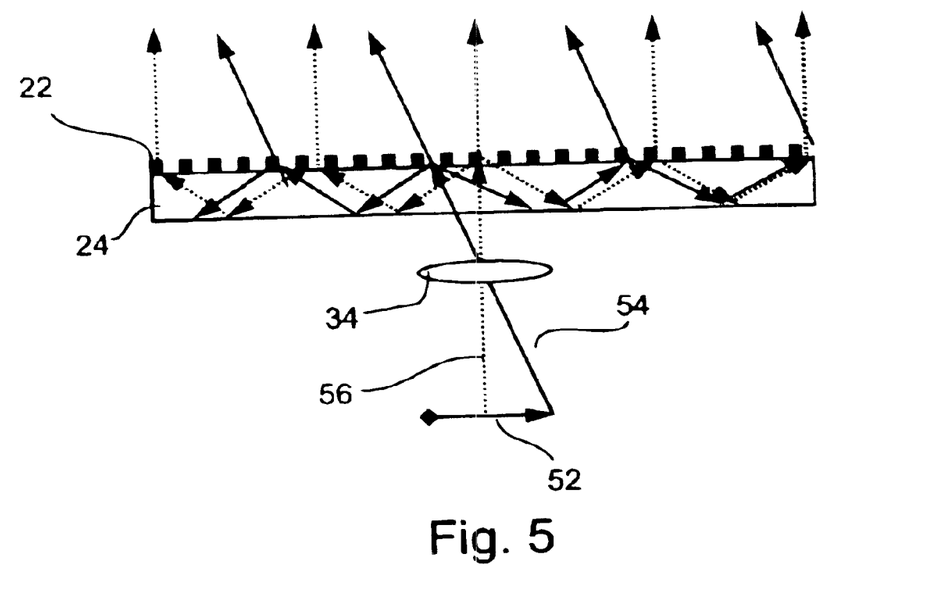
FIG. 5 is a short side schematic illustration of the operation of a first optical expander carried by a first light-transmissive substrate, according to the teachings of the present invention.

As stated, the purpose of first light-transmissive substrate 24 and first optical expander 22 is to expand input light in a first dimension. A detailed description of the expanding operation is provided herein with reference to FIG. 5, which is a short side schematic illustration of first optical expander 22 carried by first light-transmissive substrate 24. For simplicity, FIG. 5 illustrates an optical pathway of two rays, ray 54, shown as a solid line in FIG. 5, which is reflected by or transmitted from one end of input light source 52; and ray 56 shown as a dotted line in FIG. 5, which is reflected by or transmitted from the center of input light source 52.

Ray 54, which enters first light-transmissive substrate 24 through its first side, strikes first optical expander 22, positioned on the second side of first light-transmissive substrate 24. A portion of the light energy carried by ray 54 exits to open air directed into second light-transmissive substrate 28 (not shown in FIG. 5). The remnant of ray 54 splits into two rays, each being redirected through an angle, which causes it to experience substantially total internal reflection from the first side of first light-transmissive substrate 24. After a first reflection, each ray strikes first optical expander 22 and partially refracts so that part of the light energy carried by the ray is transmitted through first optical expander 22 and the remnant is redirected, again through an angle which causes it to experience substantially total internal reflection from the first side of first light-transmissive substrate 24. Similarly, as shown in FIG. 5, ray 56 splits into three rays, one ray is transmitted outwards and two rays are redirected so as to experience substantially total internal reflection from the first side of first light-transmissive substrate 24, followed by a partial refraction from first optical expander 22.

This process of partial refraction from first optical expander 22 and total reflection from first side of first light-transmissive substrate 24 is repeated for each of the two rays initially produced from each parent incoming ray and redirected by first optical expander 22. The number of reflections that each light ray is subjected to is determined by the thickness of first light-transmissive substrate 24, specifically, thinner substrate leads to a larger number of reflections. According to a preferred embodiment of the present invention, the thickness the light-transmissive substrates may vary between about 0.5 mm and about 5 mm. For any thickness within this range, the captured parts of each incoming ray propagate in opposite directions and retain within first light-transmissive substrate 24, until the end of first optical expander 22 is reached.

Alternatively, according to a preferred embodiment of the present invention the above process may be achieved by positioning first optical expander 22 on the first side of first light-transmissive substrate 24. With this configuration, the energy carried by the light rays is completely redirected from first optical expander 22 and partially reflected upon striking the second side of first light-transmissive substrate 24. In any case, each incoming ray is multiplied into a plurality of parallel outgoing rays emerging the second side of first light-transmissive substrate 24.

Hence, a beam of light passing through first light-transmissive substrate 24 and first optical expander 22 is expanded in a manner that one lateral dimension of the outgoing beam is a magnification of the corresponding lateral dimension of the incoming beam. The image constituted by the beam is therefore "stretched" or expanded in one dimension.

In some electronic devices, the physical shape and design of the device favor propagation of the light from input light source 52 through first light-transmissive substrate 24 only in one direction, as opposed to the two opposite directions propagation described above. Hence, according to an embodiment of the present invention, the propagation direction can be controlled by positioning collimator 34 near one end of first light-transmissive substrate 24, so that incoming light is forced to propagate towards the other end.

Once light from input light source 52 refracts out of first light-transmissive substrate 24 it enters second light-transmissive substrate 28.

The following is a detailed description of the operation of optical trapping element 30 in the embodiments in which it is included. The expanded light entering the entry side of second light-transmissive substrate 28 through optical trapping element 30 is re-directed by trapping element 30 to strike the second side of second light-transmissive substrate 28 through an angle which causes it to experience substantially total internal reflection. Unlike first optical expander 22, the light ray redirected by optical trapping element 30 is not diffracted out, but rather captured and retained within second light-transmissive substrate 28.

In the preferred embodiment of the invention in which optical trapping element 30 is included, the light propagates within second light-transmissive substrate 28, as described above, until it reaches second optical expander 26. Otherwise, the light emerges from first light-transmissive substrate 24 and impinges directly on second optical expander 26. In any case, once the light impinges on second optical expander 26 it experiences a series of partial diffractions and total reflections so that the constituent image is "stretched" in a second dimension, in a manner similar to the process of stretching in a first dimension described hereinabove. Thus, according to a preferred embodiment of the present invention, the diameter of the beam emerging from second light-transmissive substrate 28, is expanded in two dimension: the diameter is expanded in a first dimension within first light-transmissive substrate 24 and in a second dimension within second light-transmissive substrate 28.

According to a preferred embodiment of the present invention, first optical expander 22 and second optical expander 26 may be manufactured as a linear diffraction grating. Such optical elements are known to allow both redirection and transmission of light striking the grating. The angle of redirection is determined by an appropriate choice of the period of the diffraction grating often called "the grating function". Furthermore, the diffraction efficiency controls the energy fraction that is transmitted at each strike of light on the grating. Hence the diffraction efficiency may be predetermined so as to achieve an output having predefined light intensities, in particular the diffraction efficiency may vary locally for providing a substantially uniform light intensities. Alternatively, according to a preferred embodiment of the present invention, first optical expander 22 and second optical expander 26 may be manufactured as a variable light transmissive surface onto which a stack of linearly stretched mini-prisms is located.

According to a preferred embodiment of the present invention, optical trapping element 30 may be in any form known in the art for trapping light within a light-transmissive substrate. For example, optical trapping element 30 may be manufactured as a linear diffraction grating. The grating function may be any grating function known in the art suitable for propagation by total internal reflection, and is described, e.g., in International Patent Application No. WO 99/52002.

Alternatively, optical trapping element 30 may be manufactured as a stack of linearly stretched mini-prisms. According to a preferred embodiment of the present invention, in the case in which both first optical expander 22 and optical trapping element 30 are in a form of linear grating, the gratings are substantially orthogonal.

In a preferred embodiment of the invention in which diffraction grating is used, the diffraction grating of each of the optical expanders can be embodied within the light-transmissive substrates by recording the interference pattern of two mutually coherent optical waves. The grating can be recorded by means of computer-generated masks and lithographic techniques, by direct writing techniques, by embossing or etching or by any other procedure known in the art. One skilled in the art will appreciate that the diffraction gratings of first, second and third diffractive optical elements, which may be used in any of the preferred embodiments of the invention described herein, may include any combination of reflection linear diffraction gratings and transmission linear diffraction gratings.

The present invention also addresses the problem of enlarging an eye-box of miniature color images. It is a well-known physical phenomenon that lights of different wavelengths (i.e., different colors) diffract on equal diffractive elements through different angles. The principles of maintaining color registration employed by device 20 are herein described.

Hence, according to a preferred embodiment of the present invention, the linear gratings of second optical expander 26 and optical trapping element 30 are oriented substantially parallel to each other. Further in accordance with a preferred embodiment of the present invention, the gratings of second optical expander 26 and optical trapping element 30 are with equal periodicity. With this optical expanders configuration any achromatic diffraction occurred at optical trapping element 30, is compensated at second optical expander 26, and color information may be transmitted without distortion. Similarly, color information is transmitted through first light-transmissive substrate 24 by maintaining grating linearity and periodicity throughout first optical expander 22.

It should be understood that first light-transmissive substrate 24 and second light-transmissive substrate 28 may each independently be manufactured from any material which enables transmission of visible light therethrough, such as, but not limited to, glass or transparent plastic. In any case, the index of refraction of the light-transmissive substrates materials should be larger than the index of refraction of air, or any other material engaging the inter-substrate spacing. According to a preferred embodiment of the present invention, a typical width of both light-transmissive substrates ranges between from about 20 mm to about 60 mm. A typical length of both first optical expander and optical trapping element 30 ranges from about 5 mm to about 10 mm. A typical length of second optical expander 26 ranges from about 40 mm to about 100 mm.

Figure 6:
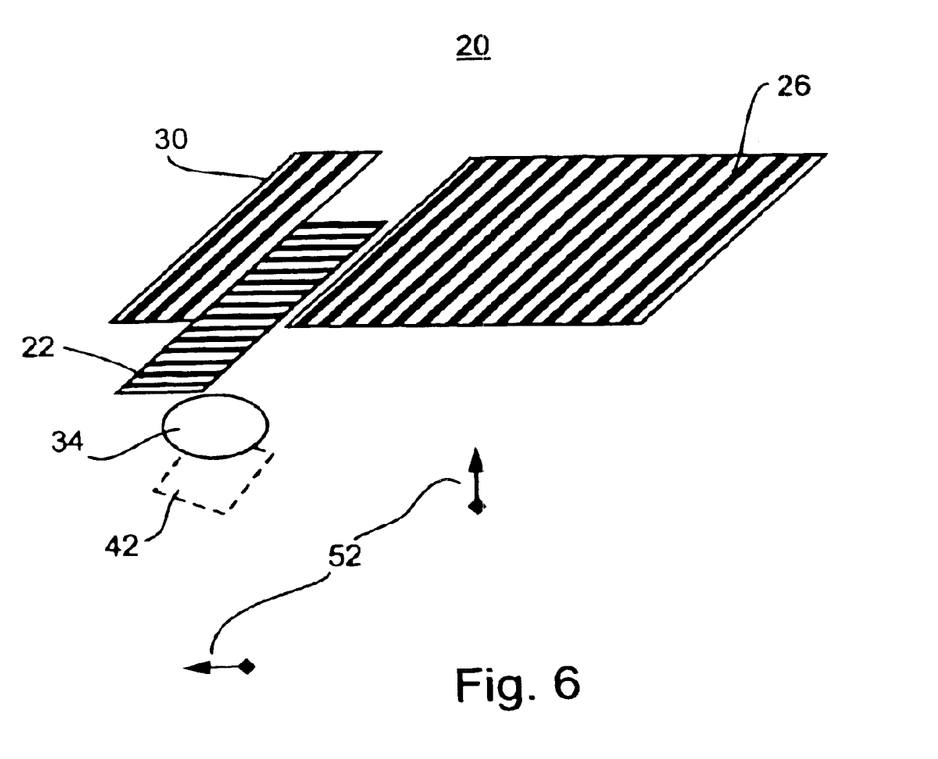
FIG. 6 is an isometric view of a device for enlarging an eye-box, according to the teachings of the present invention.

The advantage of the present invention is by its success for providing a compact device for enlarging an eye-box, without the need to scarify neither the quality nor the color registration of the image. An isometric view of device 20 is shown in FIG. 6, which illustrates the volume engaged by device 20. The preferred position of input light source 52 depends on whether or not optical element 42 is included in device 20. In the embodiments of the present invention in which optical element 42 is included, the preferred position in front of optical element 42, otherwise the preferred position is behind collimator 34. Both positions are illustrated in FIG. 6 as a dotted line (with optical element 42) and a solid line (without optical element 42). A typical volume engaged by both light-transmissive substrates is about 10 cubic cm. Including collimator 34, optical element 42 and input light source 52 which is taken to have a typical thickness of a liquid crystal display, the total estimated volume of device 20 is about 13 cubic cm.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An optical device for enlarging an eye box, the optical device comprising:
   (a) a first optical expander being carried by, or formed in, a first light-transmissive substrate engaging a first plane; and
   (b) a second optical expander being carried by, or formed in, a second light-transmissive substrate engaging a second plane being spaced apart from said first plane;
   said first and said second optical expanders being designed and configured such that:
   (i) at least a first portion of light entering said first light-transmissive substrate experiences a substantially total internal reflection, diffracted by said first optical expander and exits from said first light-transmissive substrate expanded in a first dimension; and
   (ii) at least a second portion of said first portion of light enters said second light-transmissive substrate, experiences a substantially total internal reflection, diffracted by said second optical expander and exits from said second light-transmissive substrate expanded in a second dimension;
   such that light rays of said light entering said first light-transmissive substrate are multiplied into a plurality of substantially parallel outgoing rays exiting said second light-transmissive substrate, hence enlarging an eye box of the optical device in both said first and said second dimensions.

2. The optical device of claim 1, wherein said first and second planes are substantially parallel.

3. The optical device of claim 1, wherein said first and second dimensions are substantially orthogonal.

4. The optical device of claim 2, wherein said first and second dimensions are substantially orthogonal.

5. The optical device of claim 1, further comprising an input light source for producing said light.

6. The optical device of claim 5, wherein said input light source comprises an input display source, hence said light constitutes an image.

7. The optical device of claim 1, wherein said first and second optical expanders substantially parallel one another and at least partially overlap in a direction substantially perpendicular both thereto.

8. The optical device of claim 6, wherein said first optical expander is configured and designed so as to transform spherical waves emanating from said input display source into plane waves, to at least partially diffract said plane waves, and to reflect said plane waves within said first light-transmissive substrate, hence to expand said image in said first dimension.

9. The optical device of claim 8, wherein said second optical expander is configured and designed so as to at least partially diffract at least a portion of light rays exiting said first light-transmissive substrate, hence to expand said image in said second dimension, and to couple said light rays out of said second light-transmissive substrate in a direction of an eye of a user.

10. The optical device of claim 1, further comprising:
   (c) an optical trapping element being carried by, or formed in, said second light-transmissive substrate and being laterally displaced from said second optical expander.

11. The optical device of claim 10, wherein said optical trapping element is configured and designed so as to trap at least a portion of light rays exiting said first light-transmissive substrate, inside said second light-transmissive substrate by substantially total internal reflection, hence to propagate said plurality of light rays in a direction of said second optical expander.

12. The optical device of claim 11, wherein said second optical expander is configured and designed so as to at least partially diffract said plurality of light rays, propagated through said second light-transmissive substrate, hence to expand said image in said second dimension, and to couple said plurality of light rays out of said second light-transmissive substrate in a direction of an eye of a user.

13. The optical device of claim 1, wherein each of said first and said second optical expanders is embodied in said light-transmissive substrates by recording an interference pattern of two mutually coherent optical waves.

14. The optical device of claim 13, wherein said interference pattern comprise linear diffraction gratings.

15. The optical device of claim 14, wherein said linear diffraction gratings of said second optical expander is substantially orthogonal to said linear diffraction gratings of said first optical expander.

16. The optical device of claim 14, wherein said linear diffraction gratings of said first and second optical expanders are each independently selected from the group consisting of reflection linear diffraction gratings and transmission linear diffraction gratings.

17. The optical device of claim 13, wherein said recording is effected by a procedure selected from a group consisting of computer-generated masks, lithography, embossing, etching and direct writing.

18. The optical device of claim 10, wherein said optical trapping element, said first optical expander and said second optical expander are each independently embodied in said light-transmissive substrates by recording an interference pattern of two mutually coherent optical waves.

19. The optical device of claim 18, wherein said interference pattern comprise linear diffraction gratings.

20. The optical device of claim 19, wherein said linear diffraction gratings of said optical trapping element is substantially orthogonal to said linear diffraction gratings of said first optical expander.

21. The optical device of claim 19, wherein said linear diffraction gratings are each independently selected from the group consisting of reflection linear diffraction gratings and transmission linear diffraction gratings.

22. The optical device of claim 18, wherein said recording is effected by a procedure selected from a group consisting of computer-generated masks, lithography, embossing, etching and direct writing.

23. The optical device of claim 19, wherein said linear diffraction gratings of said optical trapping element is substantially parallel to said linear diffraction gratings of said second optical expander.

24. The optical device of claim 19, wherein said linear diffraction gratings of said second optical expander and said optical trapping element are with equal periodicity.

25. The optical device of claim 1, wherein each of said first and second light-transmissive substrates comprises a first surface and a second surface.

26. The optical device of claim 25, wherein said first optical expander is embodied in said first surface of said first light-transmissive substrate.

27. The optical device of claim 25, wherein said first optical expander is embodied in said second surface of said first light-transmissive substrate.

28. The optical device of claim 5, further comprising a collimator for collimating said light produced by said input light source.

29. The optical device of claim 28, wherein said collimator comprises a converging lens.

30. The optical device of claim 28, wherein said collimator comprises a diffractive optical element carried by, or formed in, said first light-transmissive substrate.

31. The optical device of claim 1, further comprising at least one optical element for redirecting light rays, positioned so as to reduce an overall size of the optical device.

32. The optical device of claim 31, wherein said at least one optical element is a 45 degrees mirror.

33. The optical device of claim 1, wherein each of said first optical expander and said second optical expander has a predetermined diffraction efficiency.

34. The optical device of claim 33, wherein said predetermined diffraction efficiency varies locally for achieving an output having substantially uniform light intensities.

35. The optical device of claim 33, wherein said predetermined diffraction efficiency varies locally for achieving an output having predefined intensities.

36. The optical device of claim 10, wherein said optical trapping element has a predetermined diffraction efficiency.

37. The optical device of claim 36, wherein said predetermined diffraction efficiency varies locally for achieving an output having substantially uniform light intensities.

38. The optical device of claim 36, wherein said predetermined diffraction efficiency varies locally for achieving an output having predefined intensities.

39. The optical device of claim 1, wherein said first and said second optical expanders are each independently a plurality of linearly stretched mini-prisms, carried by a variable light transmissive surface.

40. The optical device of claim 10, wherein said optical trapping element is a plurality of linearly stretched mini-prisms.

41. The optical device of claim 1, wherein said first light-transmissive substrate and said second light-transmissive substrate are of thickness ranging between about 0.5 mm and about 5 mm.

42. The optical device of claim 1, wherein said first light-transmissive substrate and said second light-transmissive substrate are each independently selected from the group consisting of glass and transparent plastic.

43. A method of enlarging an eye box, the method comprising:
  (a) expanding inputted light rays in a first dimension by propagating said light rays in a first light-transmissive substrate via a substantially total internal reflection and diffracting said light rays out of said first light-transmissive substrate using a first optical expander engaging a first plane; and
  (b) expanding said inputted light rays in a second dimension by propagating said light rays in a second light-transmissive substrate via a substantially total internal reflection and diffracting said light rays out of said second light-transmissive substrate using a second optical expander, in a manner such that said inputted light rays are multiplied into a plurality of substantially parallel outgoing rays exiting said second light-transmissive substrate, said second light-transmissive substrate engaging a second plane being spaced apart from said first plane;
  hence enlarging the eye box in both said first and said second dimensions.

44. The method of claim 43, wherein said first and second planes are substantially parallel.

45. The method of claim 43, wherein said first and second dimensions are substantially orthogonal.

46. The optical device of claim 44, wherein said first and second dimensions are substantially orthogonal.

47. The method of claim 43, wherein said inputted light rays constitutes an image.

48. The method of claim 43, wherein said first and second optical expanders substantially parallel one another and at least partially overlap in a direction substantially perpendicular both thereto.

49. The method of claim 43, wherein said expanding in said first dimension and said second dimension comprises at least partially diffracting said inputted light rays.

50. The method of claim 49, wherein said expanding in said first dimension further comprises reflecting said inputted light rays within a first light-transmissive substrate, by substantially total reflection determined by said first optical expander.

51. The method of claim 50, wherein said expanding in said second dimension further comprises reflecting said light rays within a second light-transmissive substrate, by substantially total reflection determined by said second optical expander.

52. The method of claim 43, further comprising prior to step (b):
   passing said light rays through an optical trapping element engaging said second plane and being laterally displaced from said second optical expander thereby propagating said light rays through a light guide in a direction of said second optical expander.

53. The method of claim 52, wherein said light guide is a second light-transmissive substrate enabling said inputted light rays to propagate therethrough by substantially total internal reflection determined by said optical trapping element.

54. The method of claim 52, wherein said expanding in said second dimension comprises at least partially diffracting said inputted light rays propagated through said light guide.

55. The method of claim 54, wherein said expanding in said second dimension further comprises reflecting said inputted light rays within said light guide, by substantially total reflection determined by said second optical expander.

56. The method of claim 51, wherein each of said first and said second optical expanders is respectively embodied in said first and said second light-transmissive substrates by recording an interference pattern of two mutually coherent optical waves.

57. The method of claim 56, wherein said interference pattern comprise a linear diffraction gratings.

58. The method of claim 57, wherein said linear diffraction gratings of said second optical expander is substantially orthogonal to said linear diffraction gratings of said first optical expander.

59. The method of claim 57, wherein said linear diffraction gratings of said first and said second optical expanders are each independently selected from the group consisting of reflection linear diffraction gratings and transmission linear diffraction gratings.

60. The method of claim 56, wherein said recording is effected by a procedure selected from a group consisting of computer-generated masks, lithography, embossing, etching and direct writing.

61. The method of claim 52, wherein said optical trapping element, said first optical expander and said second optical expander are each independently embodied in said light-transmissive substrates by recording an interference pattern of two mutually coherent optical waves.

62. The method of claim 61, wherein said interference pattern comprise linear diffraction gratings.

63. The method of claim 62, wherein said linear diffraction gratings of said optical trapping element is substantially orthogonal to said linear diffraction gratings of said first optical expander.

64. The method of claim 62, wherein said linear diffraction gratings are each independently selected from the group consisting of reflection linear diffraction gratings and transmission linear diffraction gratings.

65. The method of claim 61, wherein said recording is effected by a procedure selected from a group consisting of computer-generated masks, lithography, embossing, etching and direct writing.

66. The optical device of claim 62, wherein said linear diffraction gratings of said optical trapping element is substantially parallel to said linear diffraction gratings of said second optical expander.

67. The method of claim 62, wherein said linear diffraction gratings of said second optical expander and said optical trapping element are with equal periodicity.

68. The method of claim 50, wherein said first light-transmissive substrate comprises a first surface and a second surface.

69. The method of claim 68, wherein said first optical expander is embodied in said first surface of said first light-transmissive substrate.

70. The method of claim 68, wherein said first optical expander is embodied in said second surface of said first light-transmissive substrate.

71. The method of claim 43, further comprising collimating said inputted light.

72. The method of claim 71, wherein said collimating is done by a converging lens.

73. The method of claim 71, wherein said collimating is done by a diffractive optical element.

74. The method of claim 43, further comprising redirecting said inputted light, so as to reduce a distance between said first plane and an input light source producing said inputted light.

75. The method of claim 74, wherein said redirecting is done by a 45 degrees mirror.

76. The method of claim 43, wherein each of said, first and said second optical expanders has a predetermined diffraction efficiency.

77. The method of claim 76, wherein said predetermined diffraction efficiency varies locally for achieving an output having substantially uniform light intensities.

78. The method of claim 76, wherein said predetermined diffraction efficiency varies locally for achieving an output having predefined intensities.

79. The optical device of claim 52, wherein said optical trapping element has a predetermined diffraction efficiency.

80. The optical device of claim 79, wherein said predetermined diffraction efficiency varies locally for achieving an output having substantially uniform light intensities.

81. The optical device of claim 79, wherein said predetermined diffraction efficiency varies locally for achieving an output having predefined intensities.

82. The method of claim 43, wherein said first and said second optical expanders are each independently a plurality of linearly stretched mini-prisms, carried by a variable light transmissive surface.

83. The method of claim 52, wherein said optical trapping element is a plurality of linearly stretched mini-prisms.

84. The method of claim 50, wherein said first light-transmissive substrate is of thickness ranging between about 0.5 mm and about 5 mm.

85. The method of claim 53, wherein said second light-transmissive substrate is of thickness ranging between about 0.5 mm and about 5 mm.

86. The method of claim 50, wherein said first light-transmissive substrate is selected from the group consisting of glass and transparent plastic.

87. The method of claim 53, wherein said second light-transmissive substrate is selected from the group consisting of glass and transparent plastic.

88. A method of manufacturing an optical device, for enlarging an eye box, the method comprising:
   (a) positioning a first light-transmissive substrate having a first optical expander carried thereby, or formed therein in a first plane; and
   (b) positioning a second light-transmissive substrate having a second optical expander carried thereby, or formed therein, said first and said second optical expanders being designed and configured such that:
  (i) at least a first portion of light entering said first light-transmissive substrate experiences a substantially total internal reflection, diffracted by said first optical expander and exits from said first light-transmissive substrate expanded in a first dimension; and
  (ii) at least a second portion of said first portion of light enters said second light-transmissive substrate, experiences a substantially total internal reflection, diffracted by said second optical expander and exits from said second light-transmissive substrate expanded in a second dimension;
  such that light rays of said light entering said first light-transmissive substrate are multiplied into a plurality of substantially parallel outgoing rays exiting said second light-transmissive substrate.

89. The method of claim 88, wherein said first and second planes are substantially parallel.

90. The method of claim 88, wherein said first and second dimensions are substantially orthogonal.

91. The optical device of claim 89, wherein said first and second dimensions are substantially orthogonal.

92. The method of claim 88, further comprising positioning an input light source for producing said light.

93. The method of claim 92, wherein said input light source comprises an input display source, hence said light constitutes an image.

94. The method of claim 88, wherein said first and second optical expanders substantially parallel one another and at least partially overlap in a direction substantially perpendicular both thereto.

95. The method of claim 93, wherein said first optical expander is designed and configured so as to transform spherical waves emanating from said input display source into plane waves, to at least partially diffract said plane waves, and to reflect said plane waves within said first light-transmissive substrate, hence to expand said image in said first dimension.

96. The method of claim 95, wherein said second optical expander is configured and designed so as to at least partially diffract at least a portion of light rays exiting said first light-transmissive substrate, hence to expand said image in said second dimension, and to couple said light rays out of said second light-transmissive substrate in a direction of an eye of a user.

97. The method of claim 88, further comprising:
  (c) providing an optical trapping element being carried by, or formed in, said second light-transmissive substrate and being laterally displaced from said second optical expander.

98. The method of claim 97, wherein said optical trapping element is configured and designed so as to trap at least a portion of light rays exiting said first light-transmissive substrate, inside said second light-transmissive substrate by substantially total internal reflection, hence to propagate said plurality of light rays in a direction of said second optical expander.

99. The method of claim 98, wherein said second optical expander is configured and designed so as to at least partially diffract said plurality of light rays, propagated through said second light-transmissive substrate, hence to expand said image in said second dimension, and to couple said plurality of light rays out of said second light-transmissive substrate in a direction of an eye of a user.

100. The method of claim 88, wherein each of said first and said second optical expanders is embodied in said light-transmissive substrates by recording an interference pattern of two mutually coherent optical waves.

101. The method of claim 100, wherein said interference pattern comprise linear diffraction gratings.

102. The method of claim 101, wherein said linear diffraction gratings of said second optical expander is substantially orthogonal to said linear diffraction gratings of said first optical expander.

103. The method of claim 101, wherein said linear diffraction gratings of said first and second optical expanders are each independently selected from the group consisting of reflection linear diffraction gratings and transmission linear diffraction gratings.

104. The method of claim 100, wherein said recording is effected by a procedure selected from a group consisting of computer-generated masks, lithography, embossing, etching and direct writing.

105. The method of claim 97, wherein said optical trapping element, said first optical expander and said second optical expander are each independently embodied in said light-transmissive substrates by recording an interference pattern of two mutually coherent optical waves.

106. The method of claim 105, wherein said interference pattern comprise linear diffraction gratings.

107. The method of claim 106, wherein said linear diffraction gratings of said optical trapping element is substantially orthogonal to said linear diffraction gratings of said first optical expander.

108. The method of claim 106, wherein said linear diffraction gratings are each independently selected from the group consisting of reflection linear diffraction gratings and transmission linear diffraction gratings.

109. The method of claim 105, wherein said recording is effected by a procedure selected from a group consisting of computer-generated masks, lithography, embossing, etching and direct writing.

110. The method of claim 106, wherein said linear diffraction gratings of said optical trapping element is substantially parallel to said linear diffraction gratings of said second optical expander.

111. The method of claim 106, wherein said linear diffraction gratings of said second optical expander and said optical trapping element are with equal periodicity.

112. The method of claim 88, wherein each of said first and second light-transmissive substrates comprises a first surface and a second surface.

113. The method of claim 112, wherein said first optical expander is embodied in said first surface of said first light-transmissive substrate.

114. The method of claim 112, wherein said first optical expander is embodied in said second surface of said first light-transmissive substrate.

115. The method of claim 92, further comprising positioning a collimator for collimating said light produced by said input light source.

116. The method of claim 115, wherein said collimator comprises a converging lens.

117. The method of claim 115, wherein said collimator comprises a diffractive optical element carried by, or formed in, said first light-transmissive substrate.

118. The method of claim 88, further comprising positioning at least one optical element for redirecting light rays, positioned so as to reduce an overall size of the optical device.

119. The method of claim 118, wherein said at least one optical element is a 45 degrees mirror.

120. The method of claim 88, wherein each of said first optical expander and said second optical expander has a predetermined diffraction efficiency.

121. The method of claim 120, wherein said predetermined diffraction efficiency varies locally for achieving an output having substantially uniform light intensities.

122. The method of claim 120, wherein said predetermined diffraction efficiency varies locally for achieving an output having predefined intensities.

123. The method of claim 97, wherein said optical trapping element has a predetermined diffraction efficiency.

124. The method of claim 123, wherein said predetermined diffraction efficiency varies locally for achieving an output having substantially uniform light intensities.

125. The method of claim 123, wherein said predetermined diffraction efficiency varies locally for achieving an output having predefined intensities.

126. The method of claim 88, wherein said first and said second optical expanders are each independently a plurality of linearly stretched mini-prisms, carried by a variable light transmissive surface.

127. The method of claim 97, wherein said optical trapping element is a plurality of linearly stretched mini-prisms.

128. The method of claim 88, wherein said first light-transmissive substrate and said second light-transmissive substrate are of thickness ranging between about 0.5 mm and about 5 mm.

129. The method of claim 88, wherein said first light-transmissive substrate and said second light-transmissive substrate are each independently selected from the group consisting of glass and transparent plastic.

130. An optical device for enlarging an eye box, the optical device comprising:

a first light-transmissive substrate engaging a first plane; and a second light-transmissive substrate engaging a second plane being spaced apart from said first plane;

said first and said second light-transmissive substrates designed and configured such that light passing through the device first experiences a substantially total internal reflection in said first light-transmissive substrate such that said light exits from said first light-transmissive substrate expanded in a first dimension, and then experiences a substantially total internal reflection in said second light-transmissive substrate such that said light exits from said second light-transmissive substrate expanded in a second dimension, such that light rays of said light passing through the device are multiplied into a plurality of substantially parallel outgoing rays exiting said second light-transmissive substrate, hence enlarging an eye box of the optical device in both said first and said second dimensions.

131. The optical device of claim 130, wherein said first and second planes are substantially parallel.

132. The optical device of claim 130, wherein said first and second dimensions are substantially orthogonal.

133. The optical device of claim 131, wherein said first and second dimensions are substantially orthogonal.

134. The optical device of claim 130, further comprising an input light source for producing said light.

135. The optical device of claim 134, wherein said input light source comprises an input display source, hence said light constitutes an image.

136. The optical device of claim 134, further comprising a collimator for collimating said light produced by said input light source.

137. The optical device of claim 136, wherein said collimator comprises a converging lens.

138. The optical device of claim 130, further comprising at least one optical element for redirecting light rays, positioned so as to reduce an overall size of the optical device.

139. The optical device of claim 138, wherein said at least one optical element is a 45 degrees mirror.

140. The optical device of claim 130, wherein said first light-transmissive substrate and said second light-transmissive substrate are of thickness ranging between about 0.5 mm and about 5 mm.

141. The optical device of claim 130, wherein said first light-transmissive substrate and said second light-transmissive substrate are each independently selected from the group consisting of glass and transparent plastic.

* * * * *